Nov. 6, 1945.  O. E. HAMRICK  2,388,538
BRAKE RELEASE VALVE
Filed July 13, 1944
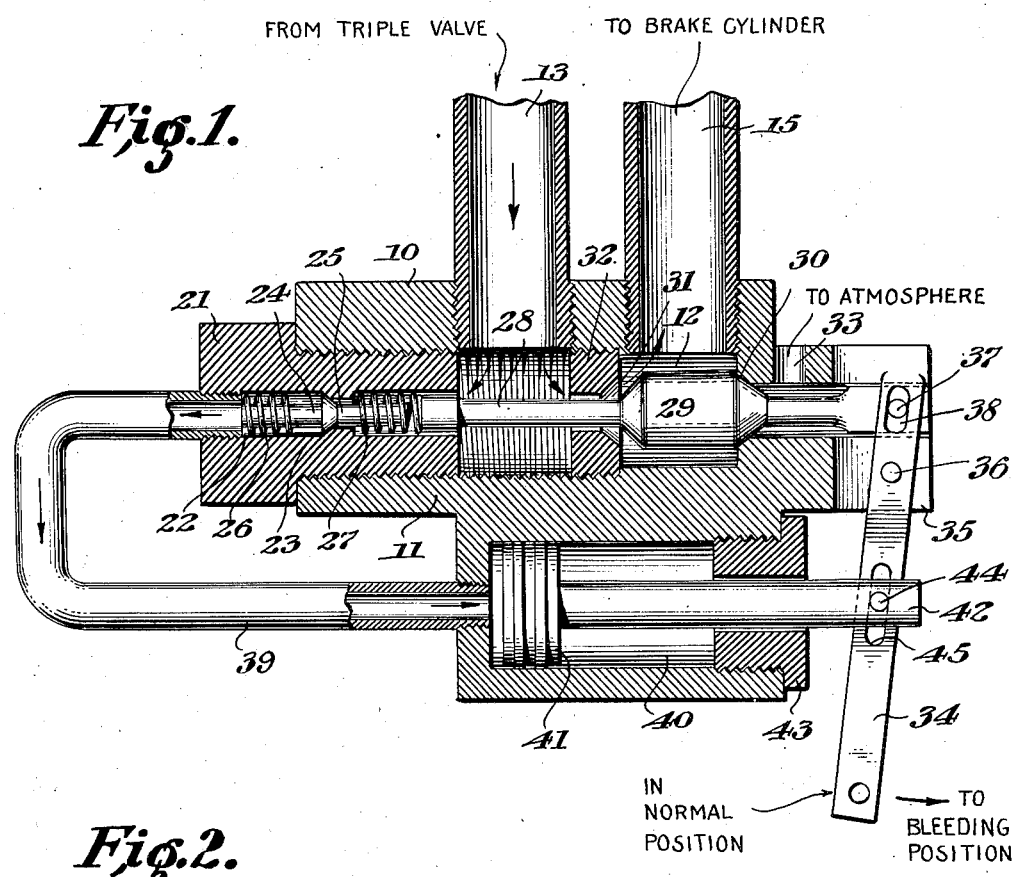
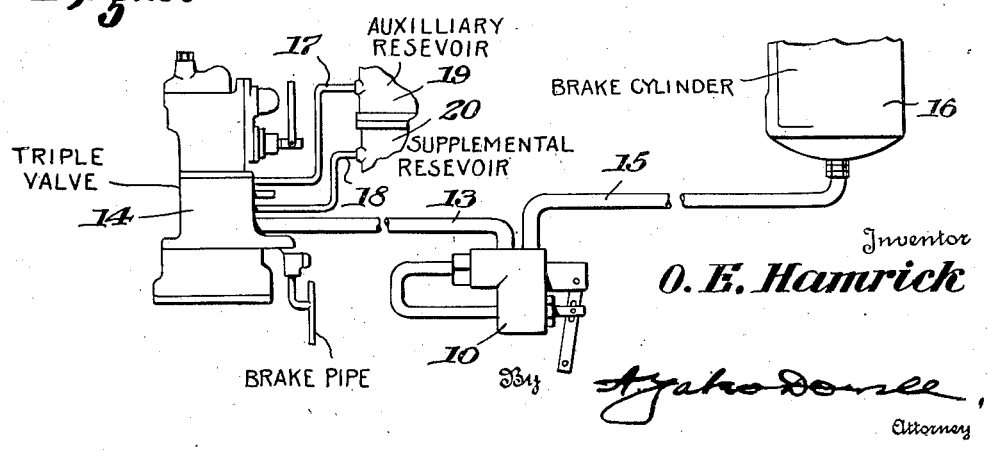
Inventor
O. E. Hamrick Patented Nov. 6, 1945

2,388,538

UNITED STATES PATENT OFFICE 2,388,538

BRAKE RELEASE VALVE

Obie E. Hamrick, Erie, Pa.

Application July 13, 1944, Serial No. 544,764

4 Claims. (Cl. 303—68)

This invention relates to air brake systems, and more particularly to a valve for releasing the air to free the brakes.

It is often necessary or desirable to release the air brakes on cars preparatory to setting them out of a train, for switching at terminals, or in yards preparatory to inspecting the brake rigging, installing brake shoes, or inspecting the brakes. Valves have heretofore been used for this purpose operated from the engineer's cab to release the brakes on all the cars in a train. This was ineffective as regards brakes on any particular car when the latter was detached from the train. Likewise manually operated release valves have been employed but it was necessary to hold these open manually until the air brake cylinder had been relieved of the pressure and the brakes restored to normal position.

Among the objects of the present invention is to provide a manually operated release valve between the control or triple valve and the brake cylinder without the necessity of any change in the construction of either.

It is a further object of the invention to provide a valve of this character with an automatic holding means which will hold the valve open after it has been initially operated until the pressure from the storage tank has been relieved, after which the valve will be restored to normal position.

A further object of the invention is to provide a hand operated release valve which will conserve air in the system by only releasing the air in the brake cylinder at the time the valve is operated.

Another object of the invention is to provide a hand-operated release valve operable only when the brakes are applied and which will cut off communication between the reservoir and the brake cylinder and prevent additional air from the reservoir from reaching the brake cylinder while the latter is being relieved of pressure.

Another object of the invention is to provide a hand-operated release valve wherein, if operated to release the brakes on a car and the brakes are stuck, the supply of air from the reservoir to the brakes will be interrupted but if the brakes are normally released the release valve will be restored to normal position and the supply of air from the reservoir to the brake cylinder will be resumed.

It will be readily understood that the valve of the present invention is initially hand-operated, and then continues in operation as an automatic valve. Further, the valve will only bleed the brake cylinder on the car of which it is a part of the brake system.

Other advantages and features of novelty will become apparent in view of the following description taken in conjunction with the drawing, wherein:

Figure 1 is a vertical section of a manually operable release valve in accordance with the present invention;

Fig. 2 is a detail assembly illustrating the application of the invention to a braking system.

Referring to the drawing, the hand-operated release valve is formed of a body 10 having a threaded bore 11 terminating in a concentric valve chamber 12, compressed air is admitted to the threaded bore 11 of the body 10 through a pipe 13 from a triple valve 14, and air is discharged from the valve chamber 12 of the valve body through a pipe 15 to the brake cylinder 16. The triple valve is of the conventional construction and has connections 17 and 18 respectively, with auxiliary and supplemental reservoirs 19 and 20.

Within the end of the threaded bore 11 is threaded a plug or cap 21 having a longitudinal bore 22 with a constricted intermediate portion providing a valve seat 23. The valve seat 23 is adapted to be engaged by a valve head 24 on a stem 25. On opposite sides of the reduced shoulder which forms the valve seat in the bore 22 around the valve stem 25 are helical springs 26 and 27, the former normally urging the valve 24 against its seat, and the spring 27 bearing against the enlarged end of a valve stem 28 which carries a valve body 29 thereon in the valve chamber 12. Opposite ends of the valve body 29 are tapered for cooperative engagement with valve seats 30 and 31. The spring 27 normally tends to seat the valve body 29 against its seat 30. The valve seat 31 is formed in a plug 32 having its external threads in engagement with the threads of the bore 11 such plug also having a central bore for free movement of the valve stem 28. The triple valve is normally in communication through the pipe 13, bore 11, aperture in the plug 32, valve chamber 12, and a pipe 15, with the brake cylinder 16. In this position the valve 29 is in contact with the seat 30 and the braking system is in normally operative position. If it should be desired to release the air from the brake cylinder 16 without wasting air from other parts of the braking system all that is necessary is to move the valve 29 from its seat 30 and seat it upon its seat 31, whereupon air will be vented from the brake cylinder through the valve 30 and passage 33 to the atmosphere. An operating lever 34 is mounted in a slot 35 in the valve body by means of a pivot pin 36, and this operating lever 34 is joined by a pin 37 working in a slot 38 in the lever so that when the lever is swung on its pivot 36 the valve stem 28 is reciprocated to cause the valve to engage the seat 30 or 31.

When the primary valve 29 engages the seat 31 the stem 28 will contact the stem 25 of the secondary valve 24 and force the latter from its seat 23 and air from the triple valve through the pipe 13 will pass around the valve 24 which is off its seat 23 into a pipe 39 having one end threaded into the plug 21 and having its opposite end threaded into the end of the valve body 10 and providing communication with a cylinder 40 in which there is located a piston 41 on a rod 42 extending through a removable threaded closure plug 43 closing the open end of the cylinder. The end of the piston rod opposite the piston 41 is provided with a pin 44 which is reciprocable in a slot 45 in the bleeding or tripping lever 34. Thus, when the valve 29 is against its seat 31 air from the triple valve through the pipe 13 and pipe 39 will force the piston 41 to the right, thereby holding the bleeding or tripping lever 34 and associated parts in a definite position. This is true because the area on the end of the piston 41 is greater than the area around the valve stem 28 in the opening of the plug 32. Thus the parts will remain in the position described with the valve 29 on its seat 31 until the controlling or triple valve returns to released position, whereupon by the concerted action of the springs 26 and 27 bearing respectively against the valve 24 and the end of the valve stem 28 the parts will be moved to the opposite position with the valve 29 engaging the seat 30, whereupon compressed air from the triple valve will pass through the plug 32 and pipe 15 to the brake cylinder.

It will be readily understood that with the construction described the brakes may be released for operation by the bleeding or tripping operating lever 34, which need not be held manually but may be maintained in tripping position as long as air pressure supply is in the triple valve against the end of the piston 41.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A selective fluid pressure bleeding mechanism comprising, a casing, an inlet port arranged for communication with a storage tank for fluid under pressure, an outlet port arranged for communication with an operating tank for using fluid under pressure, a bleeding port arranged for communication with the atmosphere, a valve in operating relation to said ports, spring means normally urging said valve into its closed position, manually operated release means arranged to move said valve into its open position, and a piston in operating relation with said valve and said manually operated release means, said piston being arranged to be actuated in response to pressure in said inlet port, and against said spring means, whereby said piston will actuate said release means to close and retain said valve in closed position without materially reducing the pressure in said storage tank.

2. For use in a railway braking system, a selective fluid bleeding mechanism comprising a valve body having inlet and outlet ports for fluid under pressure and a bleeding port for venting to the atmosphere, valve means for controlling said ports, means urging said valve toward one position, manually operated means for moving said valve to its opposite position, and pneumatic means responsive to inlet port pressure for holding the valve in said last-mentioned position, whereby said piston will actuate said release means to close and retain said valve in closed position without materially reducing the pressure in the storage tank.

3. An air brake release valve comprising a valve body having inlet and discharge ports and a bleeder port, valve mechanism between said inlet and discharge ports controlling the flow through said bleeder port and through the valve so that in one position air can flow from the inlet to the discharge port but cannot flow through the bleeder port, and in the other position can flow through the bleeder port but cannot flow from the inlet to the discharge port, and means in communication with said inlet port and operable pneumatically for maintaining the valve mechanism between the inlet and discharge ports closed.

4. For use in a railway braking system a valve body, an inlet connection for admitting air from a control valve and an outlet connection for permitting air to be fed to a brake cylinder, a bleeder port for exhausting air to the atmosphere, valve means for controlling flow of air to or from a brake cylinder, said valve means when in one position admitting air to the brake cylinder and in its other position releasing air through the bleeder port from the brake cylinder, manual means for operating said valve, and pneumatic means responsive to inlet port pressure for holding said valve in operated position, whereby said piston will actuate said release means to close and retain said valve in closed position without materially reducing the pressure in the storage tank.

OBIE E. HAMRICK.